United States Patent [19]

Bonistalli

[11] 4,088,824
[45] May 9, 1978

[54] ELECTRIC FURNACE STATION NOISE AND SMOKE POLLUTION CONTROL SYSTEM

[75] Inventor: Raymond J. Bonistalli, LaGrange, Ill.

[73] Assignee: Obenchain Corporation, Pittsburgh, Pa.

[21] Appl. No.: 739,809

[22] Filed: Nov. 8, 1976

[51] Int. Cl.² .................................................. H05B 7/20
[52] U.S. Cl. .................................................... 13/9 R
[58] Field of Search ........................... 13/1, 9, 10, 33; 98/115 R, 115 K; 110/119

[56] References Cited

U.S. PATENT DOCUMENTS

| 3,760,446 | 9/1973 | Payton | 13/9 |
| 3,913,898 | 10/1975 | Wolters | 13/1 X |
| 3,979,551 | 9/1976 | Overmyer et al. | 13/10 |

Primary Examiner—R. N. Envall, Jr.
Attorney, Agent, or Firm—Parmelee, Miller, Welsh & Kratz

[57] ABSTRACT

A pollution control system for an electric furnace station which provides for noise abatement and the collection and discharge of pollutant gases during charging, refining and tapping stages of electric furnace operations. A housing surrounds the electric furnace which is sized so as to enable tilting of the furnace during tapping, the housing having movable sections to enable entry of charging means for the furnace and entry of personnel, with an exhaust means in the upper region of the housing. In addition, a tapping shield is provided having a supplementary exhaust system to remove pollutant gases during tapping and additive deposition. Air curtain or other means are provided to preclude escape of pollutants during charging of the furnace through the charging means.

3 Claims, 3 Drawing Figures

ELECTRIC FURNACE STATION NOISE AND SMOKE POLLUTION CONTROL SYSTEM

BACKGROUND OF THE INVENTION

Electric arc furnaces are often used in the melting of scrap and refining of steel where an electric current is used as a source of heat. Such furnaces are generally vessels that are equipped with a rotatable roof, which has electrodes associated therewith, and are carried by a tiltable base so that upon completion of refining, metal is poured from a tap hole at the lower portion of the vessel.

During operation of an electric furnace, there is a substantial problem associated with the noise pollution that is created. In addition, there are usually three steps which result in the production of large quantities of particulate matter and smoke which, with current environmental controls, cannot be discharged into the atmosphere. One of these steps is the charging of the furnace, during which the furnace roof assembly and electrodes are pivotally moved to one side of the furnace while scrap metal and/or molten metal are added to the furnace vessel such as by cable-carried scrap buckets or ladles. A second step which causes extensive pollution problems is the meltdown and refining step wherein fumes escape through various openings in the furnace during melting, during the addition of flux materials or alloying materials, and also during temperature determination and sampling. During such meltdown, noise caused by arcing has been recorded in the 120 dB range when using a 30 MVA Transformer in connection with a 60-ton furnace, and the current trend is to use ultra-high power transformers which will substantially increase this noise problem. Very little has been done to reduce noise levels in the shop, but rather workers have merely been provided with gear to protect their ears. Following the refining step, the tapping step produces gaseous pollutants resulting from the tapping of the furnace, where the molten metal is poured into means for collecting the metal for transfer to a subsequent station, and where generally alloying ingredients are added to the molten metal.

Previous attempts to collect fumes and smoke from an electric arc furnace operation have generally focused on three systems. One system, furnace evacuation, uses an opening in the furnace roof and additional shrouds over the tap hole, electrode holes, and charging door to pick up furnace fumes. Such a system would not meet present-day codes and does not collect fumes when the roof is off the furnace for scrap charging or the fumes generated in the steel ladle while tapping. A second system provides for a canopy in the roof of the building. Because it must be placed distant from the point of fume generation, a large amount of air is admixed with the furnace fumes requiring a large and expensive gas cleaning system for cleaning the gas. In general, this system has not been successful in cleaning the shop gases because, to reduce cost, they are usually too small. Also, rising fume is subject to shop crosswinds which blow the fume away from the canopy. Also, this system allows a dirty atmosphere within the shop itself which is hazardous to the workers. A third system is complete shop evacuation which can be made to adequately collect fumes and clean gas. However, since the entire shop is evacuated, the system is very large and expensive because of the tremendous volume of gases that must be handled to adequately clean the fumes. Again, the shop atmosphere is dirty and hazardous to the workers.

In U.S. Pat. Nos. 3,724,827 and 3,743,264, which relate to Q-BOP or BOF type installations, furnace reactions are affected by oxygen or other fuel being blown into the furnace while the furnace is upright, then creating a large volume of contaminated gas that is directed into a hood affixed to the furnace mouth or slightly spaced therefrom depending on the process step carried out at a particular time. The furnace is then rotated for charging or tapping. Such systems are not, however, adaptable to electric arc furnace installations.

An object of the present invention is to provide a means for abatement of the noise associated with electric arc furnace operations.

A further object of the present invention is to provide an electric furnace station pollution control system which eliminates the need for snorkels and hoods by providing a housing to enclose the furnace and simplifying the gas collection system to make possible the use of smaller gas cleaning systems and fans.

BRIEF DESCRIPTION OF THE INVENTION

An electric furnace station noise abatement and pollution control system wherein the station comprises a tiltable, top-chargeable furnace and associated electrodes, the top rotatable from a position closing the furnace vessel to a position alongside the furnace, the vessel having a pour spout and means for collecting and removing processed material, is provided for reducing noise and collecting and discharging pollutants during all operations for the furnace, including charging, refining and tapping steps. The improved system comprises a housing which covers the top and sides of the furnace, the housing being of such a size that the height thereof is sufficient to contain the furnace and electrodes, the electrodes being in raised or lowered position, as well as the charging ladle when in use, and the width thereof is sufficient to enable tilting of the furnace vessel, with the electrodes intact, during the tapping step, with movable sections on the housing to enable entry of a charging means, and entry of maintenance equipment, as well as entrance thereto of operating personnel. The housing has a primary exhaust means proximate the upper area of the housing to remove gases during charging and refining and an interior air curtain system to direct hot gases to the exhaust system, and a supplementary exhaust means adjacent the tapping site to exhaust gases that are produced during tapping and alloy addition to the collection means for the hot metal.

DETAILED DESCRIPTION OF THE INVENTION

Figure 1:
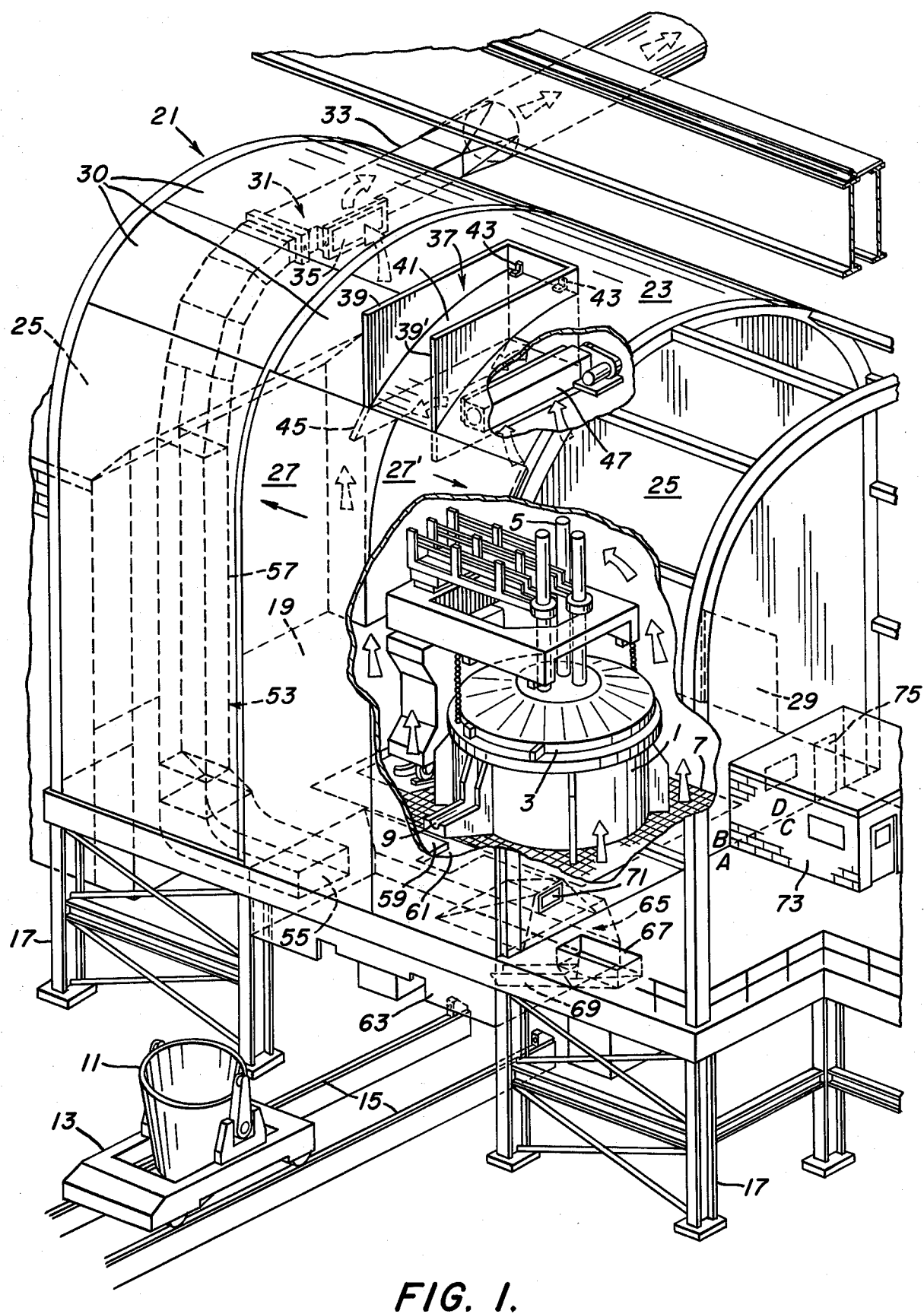
FIG. 1 schematically illustrates the noise and smoke pollution control system of the present invention, with the furnace in the operating or refining stage.
Figure 2:
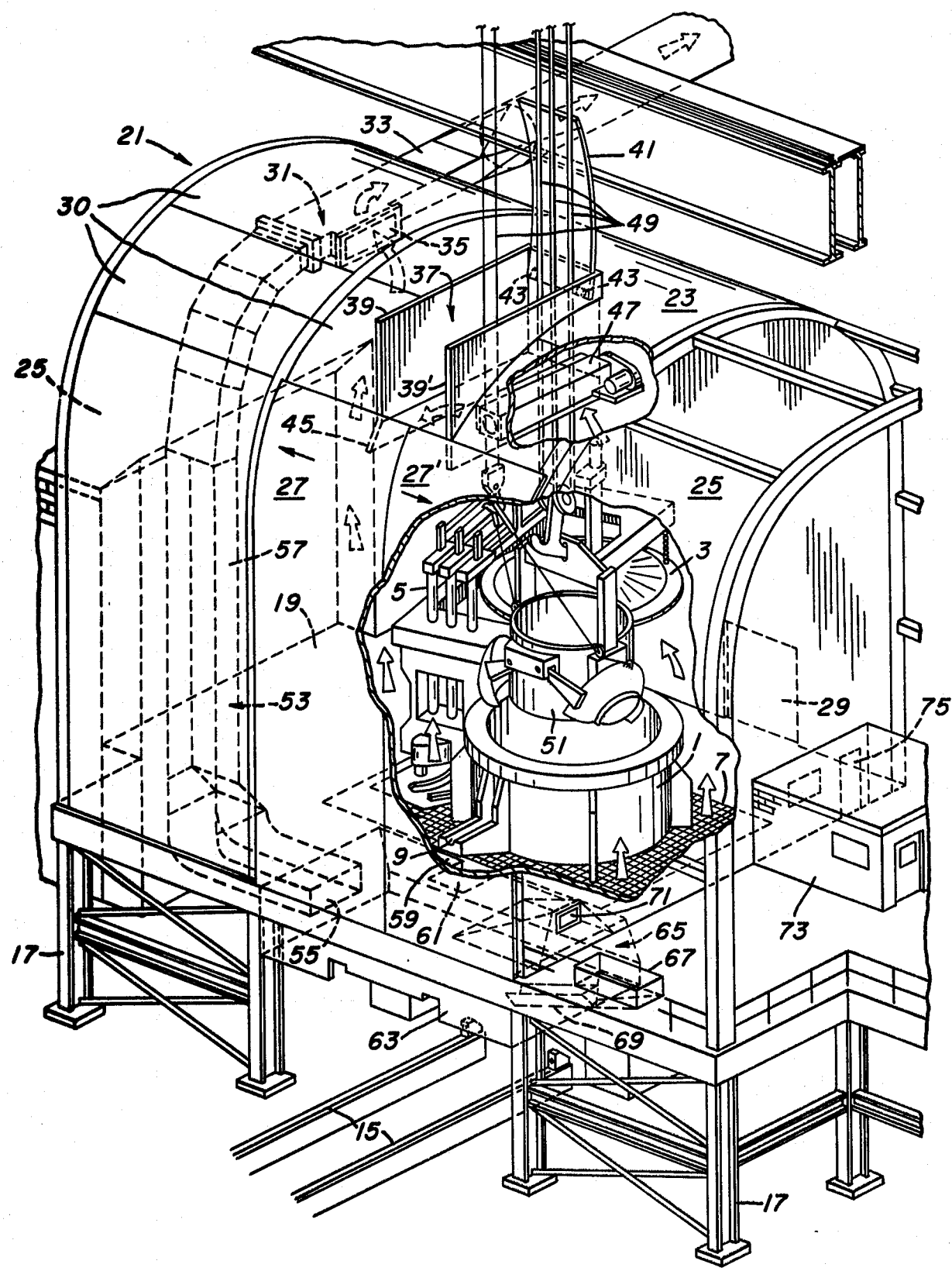
FIG. 2 schematically illustrates the noise and smoke pollution control system shown in FIG. 1 during the charging of the furnace vessel illustrating the furnace roof and electrodes rotated to one side, and the air curtain system.

Referring now to the drawings, there is illustrated therein an electric furnace having a vessel 1 with a rotatable roof 3 and associated electrodes 5. The roof 3 and its electrodes 5 are mounted so as to close the vessel 1 during the refining step as illustrated in FIG. 1 and also to enable rotation of the roof and electrodes to the side to permit charging of the vessel 1 with material to be processed, as shown in FIG. 2. The furnace is positioned on a base 7, with a small opening between the base and the remainder of the furnace station flooring, which base enables tilting of the vessel to permit tapping of the furnace, with the processed material discharged through pour spout 9, this position being illustrated in FIG. 3. Means for collecting and transferring the refined material from the electric furnace station are illustrated as a ladle 11 which is movable to a site beneath the pour spout 9 of the furnace during the tapping step, the ladle carried by a car 13 along tracks 15 for proper positioning. A supporting structure or framework 17 is used to support the base 7 and also the work area floor 19 of the electric furnace station.

This system for an electric furnace station is of conventional construction and generally was the source of a substantial noise problem as well as large quantities of pollutants, both gases and particulate matter, during operation thereof.

Figure 3:
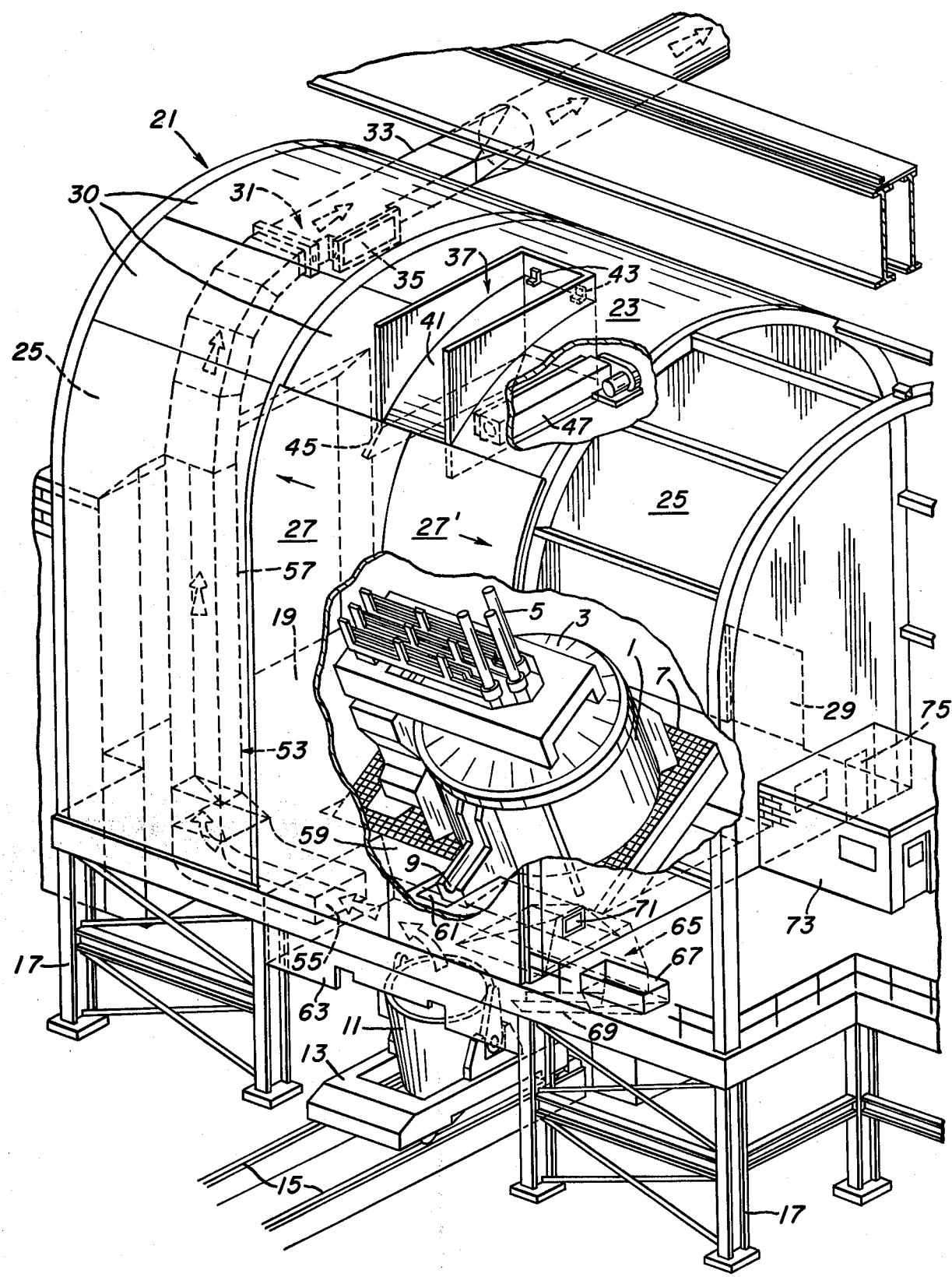
FIG. 3 schematically illustrates the noise and smoke pollution control system shown in FIG. 1 during the tapping of the furnace with the supplementary exhaust system in operation.

The present invention provides a noise and smoke pollution control system, for noise abatement and the collection and conveying of pollutants to control areas, for such a station and is illustrated in the drawings as a housing 21 which is sized to cover the top and sides of the electric furnace, its roof, and electrodes during all steps of an electric furnace operation. The housing has a roof section 23 which is of a height such that the furnace, its roof, and electrodes, in either raised or lowered position, are all covered, and side walls 25 which cover the sides of the furnace, the width between the walls being such that, in addition to enclosing the furnace during the meltdown and refining steps, the furnace vessel 1, its roof 3 and electrodes 5 are enclosed during charging of the furnace vessel, as illustrated in FIG. 2, and also sufficient to enclose the vessel 1, roof 3 and electrodes 5, while the latter two are intact on the vessel, during tapping as illustrated in FIG. 3.

The housing has movable sections such as doors 27 and 27' which may be opened, such as by sliding in the direction of the arrows shown in FIG. 1 and also a movable section such as door 29 for entry to the housing of operating personnel or vehicles to attend the furnace, for alloying, sampling and the like. In addition, removable panels 30 are provided in the roof section 23 so as to enable access to electric cables and other items requiring maintenance in connection with the electric furnace. As can be seen in the drawings, the roof of the housing 21 is below the crane bridge used for the charging crane to charge the furnace.

An exhaust means 31 is provided at the upper region of the housing 21 which collects and removes pollutants from the housing primarily during the charging and refining steps of the electric furnace operation, which exhaust means comprises a conduit 33 which cooperates with a suction device, such as a fan (not shown), and which suction device draws pollutants through an inlet 35 to the conduit and thence is drawn by the device to a gas cleaning system which removes the pollutant materials.

There is provided on the roof section 23 of the housing an entry 37 which can comprise an open area bordered by walls 39 and 39' and a panel 41 which is fastened by hinges 43 or other means to enable opening (FIG. 2) or closing of the open area. Wall 39 has thereon a downwardly depending flange 45 and there is provided an air curtain apparatus 47 which directs a flow of air transversely across the opening between walls 39 and 39' to prevent escape of pollutants from the entry, when panel 41 is open. The air curtain apparatus 47 is arranged to direct air for deflection by flange 45 and toward the exhaust inlet 35, with primarily dirty gas or air from within the housing fed to the air curtain apparatus 47, which reduces the amount of volume of gases that must be handled by the exhaust means 31. The air curtain volume is, of course, less than the fan capacity so that gases are withdrawn from the housing through exhaust means 31. Also, the air curtain is arranged to cover the entire opening in the roof. The entry 37 enables movement of cables 49 into the position illustrated in FIG. 2 to position a charging bucket 51 for charging of the furnace 1, while the flow of air from air curtain apparatus 47 directs pollutants to the inlet 35 for removal by the exhaust means from the housing. The inlet 35 is preferably provided with vanes, such as a baffle plate, to aid in directing the inflow of pollutants to the exhaust means. In the charging step, doors 27 and 27' are opened to permit entry to the housing of the bucket 51 carried by cables 49 and the doors are then closed, with the air curtain apparatus 47 preventing escape of pollutants from the housing 21 during charging of the furnace 1 and directing the pollutants to the exhaust means 31.

There is also provided on the housing 21 a supplementary exhaust means 53, adjacent the tapping site for the furnace 1, as best illustrated in FIG. 3, which illustrates the tapping stage of furnace operation. As shown in FIG. 3, the furnace 1, with roof 3 and electrodes 5 intact thereon, and base 7 are tilted with the furnace contents discharged through pour spout 9 into the ladle 11. At this stage in the operation, large quantities of pollutants are released, and the supplementary exhaust means 53 with an inlet 55 and conduit 57 carry the pollutants, by means of an exhaust fan, to the gas cleaning system. In order to direct the bulk of the pollutants to the supplementary exhaust means 53 during the tapping operation, a collecting cover plate 59 is provided, with channel 61 formed therein through which the pour spout will pass, and a downwardly depending deflecting shield 63, the cover plate directing pollutants to inlet 55 of supplementary exhaust means 53.

Also provided adjacent the tapping site is an additional additive charging means 65 which may comprise a hopper 67, chute 69 and a sight window 71 for use in adding alloying materials to the ladle 11. A control house 73, which holds operational facilities, is contiguous with a side wall 25 and has a movable closure, such as a door 75, to permit access to the housing from the control house.

As an indication of the noise abatement characteristics of the present system, using a 60-ton electric arc furnace with a 30 MVA transformer, the following data was taken. The roof 23 and side walls 25 were of 1/16 inch steel sheet, while the contiguous wall of control house 73, contiguous with a side wall 25, was of 8 inch concrete block. Readings were taken at point A (12 inches outside the steel wall), at point B (12 inches inside the steel wall), at point C (12 inches outside the concrete block wall, in the control house) and point D (12 inches inside the steel wall at a point contiguous with the block wall and in line with point C). The following readings as to noise level, decibel (dB), were noted.

| Time (Hr.-Min.) | Point A (dB) | Time (Hr.-Min.) | Point B (db) | Reduction In Sound Level (dB) | Time (Hr.-Min.) | Point C (dB) | Time (Hr.-Min.) | Point D (dB) | Reduction In Sound Level (dB) |
|---|---|---|---|---|---|---|---|---|---|
| 12:23 | 90 | 12:27 | 103 | 13 | 12:30 | 90 | 12:30 | 103 | 13 |
| 12:40 | 91.5 | 12:48 | 109 | 17.5 | 12:46 | 84 | 12:50 | 109 | 25 |
| 1:10 | 91 | 1:12 | 125 | 33 | 1:10 | 87 | 1:10 | 124 | 37 |
| 1:27 | 90 | 1:30 | 107 | 17 | 1:27 | 85 | 1:30 | 107 | 22 |
| 1:35 | 95.5 | 1:35 | 111 | 15.5 | 1:35 | 87.5 | 1:37 | 106 | 18.5 |
| 1:48 | 92 | 1:49 | 113 | 21 | 1:47 | 85 | 1:49 | 105 | 25 |
| 2:08 | 89 | 2:10 | 110 | 21 | 2:08 | 87 | 2:09 | 110 | 23 |
| 2:33 | 86 | 2:31 | 100 | 14 | 2:35 | 79 | 2:31 | 99 | 20 |
| 2:47 | 86 | 2:48 | 93 | 7 | 2:47 | 77 | 2:48 | 92 | 15 |

The above data indicates the significant noise abatement achieved by the use of the present system, the reduction being not only in degree but also the fluctuations in the noise level was reduced in the shop area surrounding the present system. Further noise reduction could be effected by the use of sound insulating panels in fabrication of the housing, for example, use of double wall steel sheet panels, with optimal use of an insulating material on one wall, or by the spraying or other application of a sound proofing material in the housing.

The present invention provides a means for noise abatement and also for collecting and discharging pollutants during all operational stages of an electric furnace. The housing provided has an exhaust means and a supplementary exhaust means which collects and removes pollutants during charging, refining and tapping sequences, with sufficient space for entry of operating and maintenance personnel to the furnace when desired.

I claim:

1. In an electric arc furnace station having a tiltable, top-chargeable electric furnace with associated electrodes and a rotatable top with means for charging the furnace, said furnace having a pour spout and means for collecting refined metal from the station, and a housing covering the top and sides of the furnace, the height thereof sufficient to contain the furnace and associated electrodes in raised or lowered position, the width thereof sufficient to enable rotating of the furnace roof during charging thereof and tilting of the furnace and electrodes during tapping, means for noise abatement and for collecting and conveying pollutant gases during charging, meltdown, refining and tapping of the furnace comprising:

movable sections on said housing to enable entry thereto of charging means for the furnace comprising first entry means in the upper section of the housing for entry of cables adapted to support a charging bucket and further entry means for entrance into said housing of said charging bucket and of operating personnel;

exhaust means proximate the upper area of the housing to remove gases therefrom during charging, meltdown, refining and tapping; and an air curtain apparatus adjacent said first entry means, arranged to direct a flow of dirty air from within said housing transversely across said first entry and toward said exhaust means while cables supporting a charging bucket extend through said first entry means during charging of the furnace.

2. In an electric arc furnace station as defined in claim 1, the improvement wherein supplementary exhaust means are provided adjacent the tapping site to exhaust gases during the tapping of the furnace.

3. In an electric arc furnace station having a tiltable, top-chargeable electric furnace with associated electrodes and a rotatable top with means for charging the furnace, said furnace having a pour spout and means for collecting refined metal from the station, and a housing covering the top and sides of the furnace, the height thereof sufficient to contain the furnace and associated electrodes in raised or lowered position, the width thereof sufficient to enable rotating of the furnace roof during charging thereof and tilting of the furnace and electrodes during tapping, means for noise abatement and for collecting and conveying pollutant gases during charging, meltdown, refining and tapping of the furnace comprising:

movable sections on said housing to enable entry thereto of charging means for the furnace comprising first entry means in the upper section of the housing for entry of cables adapted to support a charging bucket and further entry means for entrance into said housing of said charging bucket and of operating personnel;

exhaust means proximate the upper area of the housing to remove gases therefrom during charging, meltdown, refining and tapping;

an air curtain apparatus adjacent said first entry means, arranged to direct a flow of dirty air from within said enclosure transversely across said entry and towards said exhaust means while cables supporting a charging bucket extend through said first entry means during charging of the furnace; and supplementary exhaust means adjacent the tapping site to exhaust gases during tapping of the furnace.

* * * * *